United States Patent
Kasashima et al.

(10) Patent No.: US 10,874,912 B2
(45) Date of Patent: Dec. 29, 2020

(54) MULTI-PIECE SOLID GOLF BALL

(71) Applicant: Bridgestone Sports Co., Ltd., Tokyo (JP)

(72) Inventors: Atsuki Kasashima, Saitamaken (JP); Akira Kimura, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/412,951

(22) Filed: May 15, 2019

(65) Prior Publication Data

US 2019/0388736 A1 Dec. 26, 2019

(30) Foreign Application Priority Data

Jun. 22, 2018 (JP) ................. 2018-118746

(51) Int. Cl.
*A63B 37/06* (2006.01)
*A63B 37/00* (2006.01)
*B29D 99/00* (2010.01)

(52) U.S. Cl.
CPC ...... *A63B 37/0092* (2013.01); *A63B 37/0033* (2013.01); *A63B 37/0044* (2013.01); *A63B 37/0045* (2013.01); *A63B 37/0063* (2013.01); *A63B 37/0064* (2013.01); *A63B 37/0076* (2013.01); *B29D 99/0042* (2013.01)

(58) Field of Classification Search
CPC ............ A63B 37/0063; A63B 37/0092; A63B 37/0076
USPC ........................................ 473/376
See application file for complete search history.

(56) References Cited

U.S. PATENT DOCUMENTS

| | | | |
|---|---|---|---|
| 7,429,221 B1 * | 9/2008 | Bulpett | A63B 37/0003 473/376 |
| 9,764,200 B2 | 9/2017 | Watanabe et al. | |
| 9,937,384 B2 | 4/2018 | Watanabe et al. | |
| 2013/0029787 A1 * | 1/2013 | Watanabe | A63B 37/0031 473/373 |
| 2017/0136312 A1 * | 5/2017 | Watanabe | A63B 37/0022 |

FOREIGN PATENT DOCUMENTS

| | | |
|---|---|---|
| JP | 2016-116627 A | 6/2016 |
| JP | 2016-179052 A | 10/2016 |

\* cited by examiner

*Primary Examiner* — Raeann Gorden
(74) *Attorney, Agent, or Firm* — Sughrue Mion, PLLC

(57) ABSTRACT

A multi-piece solid golf ball for professional golfers and skilled amateurs in particular is endowed with an excellent distance, a soft yet good feel at impact and a good durability. In the ball, which includes a core, an envelope layer, an intermediate layer and a cover, the core has a hardness profile which satisfies specific conditions, the envelope layer has a thickness of from 0.3 to 1.2 mm, the intermediate layer has a thickness of from 0.3 to 1.2 mm, and the envelope and intermediate layers have a combined thickness from of 0.8 to 1.7 mm.

12 Claims, 1 Drawing Sheet

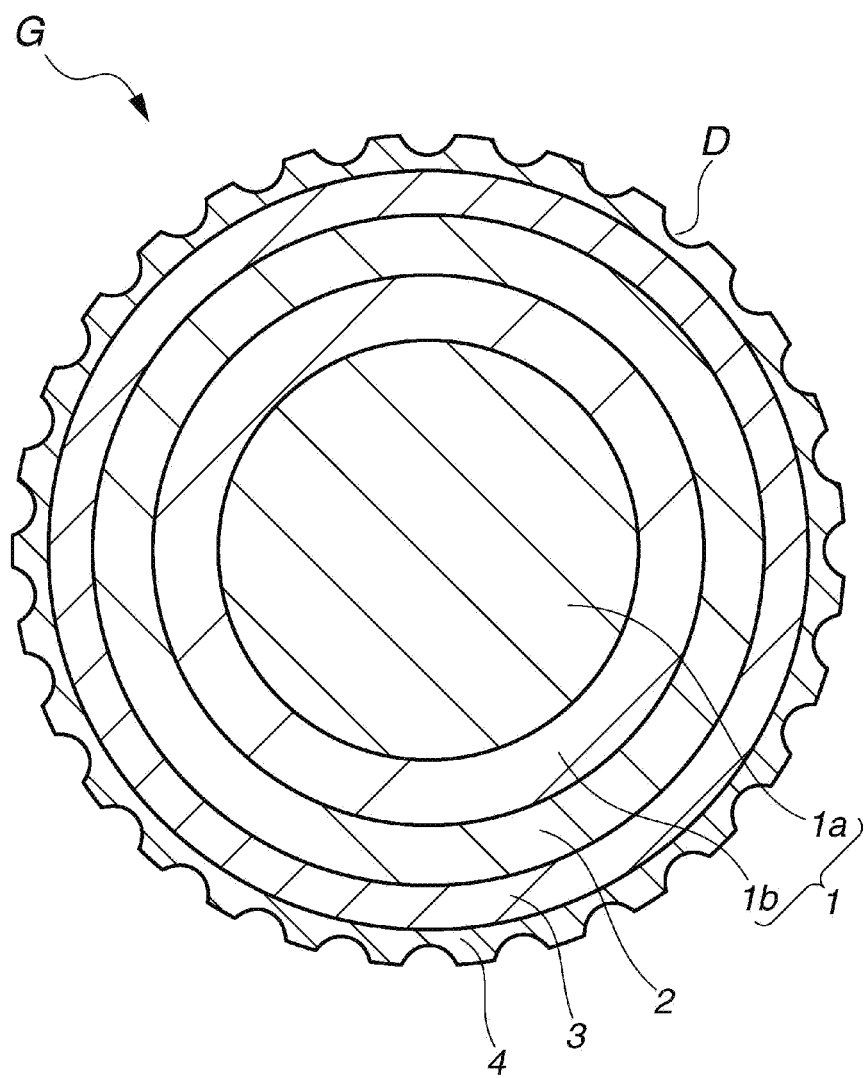

MULTI-PIECE SOLID GOLF BALL

CROSS-REFERENCE TO RELATED APPLICATION

This non-provisional application claims priority under 35 U.S.C. § 119(a) on Patent Application No. 2018-118746 filed in Japan on Jun. 22, 2018, the entire contents of which are hereby incorporated by reference.

TECHNICAL FIELD

The present invention relates to a multi-piece solid golf ball composed of four or more layers that include a core, an envelope layer, an intermediate layer and a cover.

BACKGROUND ART

Numerous innovations have hitherto been introduced in designing golf balls with a multilayer construction and many such balls have been developed to satisfy the needs of professional golfers and skilled amateurs. For example, a number of multi-piece solid golf balls that have been disclosed to date are golf balls which are composed of four or more layers, including a core, an envelope layer, an intermediate layer and a cover (outermost layer), and in which the hardness gradient at the core interior and the hardness and thickness relationships among the various layers are optimized. Examples of such multi-piece solid golf balls include those disclosed in the following patent publications: JP-A 2016-116627 and JP-A 2016-179052.

However, no effort has been made in these prior-art golf balls to optimize the hardness profile of the core and the thickness relationship among the layers, and so they are not balls capable of achieving both a good flight performance and also a solid yet soft feel at impact. Nor can they be regarded as having sufficient durability to cracking, and so there remains room for improvement.

SUMMARY OF THE INVENTION

It is therefore an object of the present invention to provide a multi-piece solid golf ball which achieves an excellent distance when hit by professional golfers and skilled amateurs, and moreover has a solid yet soft feel at impact and a good durability.

As a result of extensive investigations, we have discovered that, in a multi-piece solid golf ball having a core, an envelope layer, an intermediate layer and a cover, particularly one intended for use by professional golfers and skilled amateurs, the foregoing object can be realized by optimizing the hardness profile at the core interior in order to hold down the spin rate on full shots, obtain a high initial velocity and thereby achieve a better distance, and also by optimizing the total thickness of the envelope layer and the intermediate layer positioned as the inner ball layers between the core and the cover (outermost layer) so as to impart a feel at impact that is desirable to skilled golfers.

Accordingly, in a first aspect, the invention provides a multi-piece solid golf ball that includes a core, an envelope layer, an intermediate layer and a cover, wherein the core has a hardness profile which, letting Cc be the Shore D hardness at a center of the core, Cs be the Shore D hardness at a surface of the core and $C_{14}$ be the Shore D hardness at a position 14 mm from the core center, satisfies conditions (1) to (3) below $$54 \le Cs \le 68, \quad (1)$$

$$17 \le Cs-Cc \le 40, \text{ and} \quad (2)$$

$$0.60 \le (Cs-C_{14})/(Cs-Cc) \le 0.80; \quad (3)$$

The envelope layer has a thickness Te which is from 0.3 to 1.2 mm, the intermediate layer has a thickness Tm which is from 0.3 to 1.2 mm, and the sum Te+Tm of the envelope thickness and the intermediate layer thickness is from 0.8 to 1.7 mm.

In a preferred embodiment of the golf ball of the invention, the sphere (I) comprising the core encased by the envelope layer and the sphere (II) comprising sphere I encased by the intermediate layer have a surface hardness relationship therebetween on the Shore D scale which satisfies the following condition: surface hardness of core (Cs)<surface hardness of sphere I<surface hardness of sphere II. Preferably, the sphere II has a higher surface hardness than the ball.

In another preferred embodiment, the core comprises a spherical inner core layer and an outer layer encasing the inner core layer. Preferably, the inner core layer has a diameter of at least 28 mm.

In yet another preferred embodiment, the Shore D hardness at the center of the core (Cc) is from 25 to 44.

In still another preferred embodiment, the difference between the surface hardness of the core (Cs) and the hardness at a position 14 mm from the core center ($C_{14}$), expressed as $Cs-C_{14}$, is from 14 to 30.

In a further preferred embodiment, letting Hm be the Shore D hardness at a surface of the intermediate layer, the difference between the surface hardness of the intermediate layer and the hardness at a position 14 mm from the core center, expressed as $Hm-C_{14}$, is from 23 to 40.

In a still further preferred embodiment, letting Tc be the thickness of the cover, the relationship among the envelope layer thickness Te, the intermediate layer thickness Tm and the cover thickness Tc satisfies condition (4) below:

$$0.55 \le (Te+Tm)/(Te+Tm+Tc) \le 0.70. \quad (4)$$

Advantageous Effects of the Invention

The multi-piece solid golf ball of the invention, as a golf ball intended for professional golfers and skilled amateurs in particular, is endowed with an excellent distance, a solid yet soft feel at impact and a good durability.

BRIEF DESCRIPTION OF THE DIAGRAMS

FIG. 1 is a schematic cross-sectional view of a multi-piece solid golf ball according to one embodiment of the invention.

DESCRIPTION OF THE PREFERRED EMBODIMENTS

The objects, features and advantages of the invention will become more apparent from the following detailed description taken in conjunction with the appended diagram.

The multi-piece solid golf ball of the invention has a core, an envelope layer, an intermediate layer and a cover (outermost layer). Referring to FIG. 1, which shows an embodiment of the inventive golf ball, the ball G has a core 1, an envelope layer 2 encasing the core 1, an intermediate layer 3 encasing the envelope layer 2, and a cover 4 encasing the intermediate layer 3. The core 1 has a two-layer construction made up of a spherical inner core layer 1*a* and an outer layer 1*b* encasing the inner core layer 1*a*. Numerous dimples D are typically formed on the surface of the cover (outermost layer) 4 so as to enhance the aerodynamic properties of the ball. Although not shown in the diagram, a paint film layer is formed on the surface of the cover 4. Each layer is described in detail below.

The core has a diameter of preferably at least 36.0 mm, more preferably at least 37.0 mm, and even more preferably at least 38.0 mm. The upper limit is preferably not more than 40.5 mm, more preferably not more than 40.0 mm, and even more preferably not more than 39.5 mm. When the core diameter is too small, the feel on impact may worsen and a sufficient rebound performance may not be obtained, as a result of which it may not be possible to achieve the desired distance. On the other hand, when the core diameter is too large, the durability to repeated impact may worsen and the spin rate on shots with a driver (W #1) may increase, as a result of which it may not be possible to achieve the desired distance.

The core material is composed primarily of a rubber material. Specifically, a core-forming rubber composition can be prepared by using a base rubber as the chief component and including, together with this, other ingredients such as a co-crosslinking agent, an organic peroxide, an inert filler and an organosulfur compound. It is preferable to use polybutadiene as the base rubber. Commercial products may be used as the polybutadiene. Illustrative examples include BR01, BR51 and BR730 (from JSR Corporation).

The proportion of polybutadiene within the base rubber is preferably at least 60 wt %, and more preferably at least 80 wt % Rubber ingredients other than the above polybutadienes may be included in the base rubber, provided that doing so does not detract from the advantageous effects of the invention. Examples of rubber ingredients other than the above polybutadienes include other polybutadienes and also other diene rubbers, such as styrene-butadiene rubbers, natural rubbers, isoprene rubbers and ethylene-propylene-diene rubbers.

Examples of co-crosslinking agents include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is typically at least 5 parts by weight, preferably at least 9 parts by weight, and more preferably at least 13 parts by weight. The amount included is typically not more than 60 parts by weight, preferably not more than 50 parts by weight, more preferably not more than 40 parts by weight, and most preferably not more than 30 parts by weight, Too much may make the core too hard, giving the ball an unpleasant feel at impact, whereas too little may lower the rebound.

Commercial products may be used as the organic peroxide. Examples of such products that may be suitably used include Percumyl D, Perhexa C-40 and Perhexa 3M (all from NOF Corporation), and Luperco 231XL (from Ato-Chem Co.). One of these may be used alone, or two or more may be used together. The amount of organic peroxide included per 100 parts by weight of the base rubber is preferably at least 0.1 part by weight, more preferably at least 0.3 part by weight, even more preferably at least 0.5 part by weight, and most preferably at least 0.6 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good feel, durability and rebound.

Another compounding ingredient typically included with the base rubber is an inert filler, preferred examples of which include zinc oxide, barium sulfate and calcium carbonate. One of these may be used alone, or two or more may be used together. The amount of inert filler included per 100 parts by weight of the base rubber is preferably at least 1 part by weight, and more preferably at least 5 parts by weight. The upper limit is preferably not more than 50 parts by weight, more preferably not more than 40 parts by weight, and even more preferably not more than 35 parts by weight. Too much or too little inert filler may make it impossible to obtain a proper weight and a suitable rebound.

In addition, an antioxidant may be optionally included. Illustrative examples of suitable commercial antioxidants include Nocrac NS-6 and Nocrac NS-30 (both available from Ouchi Shinko Chemical Industry Co., Ltd.), and Yoshinox 425 (available from Yoshitomi Pharmaceutical Industries, Ltd.). One of these may be used alone, or two or more may be used together.

The amount of antioxidant included per 100 parts by weight of the base rubber is set to preferably 0 part by weight or more, more preferably at least 0.05 part by weight, and even more preferably at least 0.1 part by weight. The upper limit is set to preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable ball rebound and durability.

An organosulfur compound may be included in the core in order to impart a good resilience. The organosulfur compound is not particularly limited, provided it can enhance the rebound of the golf ball. Exemplary organosulfur compounds include thiophenols, thionaphthols, halogenated thiophenols, and metal salts of these. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of the zinc salt of pentachlorothiophenol is especially preferred.

It is recommended that the amount of organosulfur compound included per 100 parts by weight of the base rubber be preferably 0 part by weight or more, more preferably at least 0.05 part by weight, and even more preferably at least 0.1 part by weight, and that the upper limit be preferably not more than 5 parts by weight, more preferably not more than 3 parts by weight, and even more preferably not more than 2.5 parts by weight. Including too much organosulfur compound may make a greater rebound-improving effect (particularly on shots with a W #1) unlikely to be obtained, may make the core too soft or may worsen the feel of the ball at impact. On the other hand, including too little may make a rebound-improving effect unlikely.

More specifically, decomposition of the organic peroxide within the core formulation can be promoted by the direct addition of water (or a water-containing material) to the core material. The decomposition efficiency of the organic peroxide within the core-forming rubber composition is known to change with temperature; above a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the vulcanization mold, but due to the build-up of heat of decomposition by the organic peroxide which has decomposed from the outside, the temperature near the core center becomes considerably higher than the mold temperature. In cases where water (or a water-containing material) is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, Which leads to a further decrease in the amount of active radicals. As a result, it is possible to obtain a core in which the crosslink densities at the core center and the core surface differ markedly. It is also possible to obtain a core having different dynamic viscoelastic properties at the core center.

The water included in the core material is not particularly limited, and may be distilled water or tap water. The use of distilled water that is free of impurities is especially preferred. The amount of water included per 100 parts by weight of the base rubber is preferably at least 0.1 part by weight, and more preferably at least 0.3 parts by weight. The upper limit is preferably not more than 5 parts by weight, and more preferably not more than 4 parts by weight.

The core can be produced by vulcanizing/curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes.

The core may consist of a single layer alone, or may be formed as a two-layer core consisting of an inner core layer and an outer core layer. As is subsequently described, an aim of this invention is to optimize the hardness profile of the core. Forming the core of two layers is desirable for achieving this aim. When the core is formed as a two-layer core consisting of an inner core layer and an outer core layer, the inner core layer and outer core layer materials may each be composed primarily of the above-described rubber material. Also, the rubber material making up the outer core layer encasing the inner core layer may be the same as or different from the inner core layer material. The details here are the same as those given above for the ingredients of the core-forming rubber material.

In cases where the core is formed into two layers consisting of a spherical inner core layer and an outer layer encasing the inner core layer, in order to obtain a suitable hardness profile, the diameter of the inner core layer is preferably at least 25 mm, more preferably at least 26 mm, and even more preferably at least 28 mm. The upper limit is preferably not more than 34 mm, more preferably not more than 32 mm, and even more preferably not more than 31 mm.

The outer core layer encasing the inner core layer has a thickness which, in order to obtain a suitable hardness profile, is preferably at least 2.0 mm, and more preferably at least 3.0 mm. The upper limit is preferably not more than 7.0 mm, and more preferably not more than 6.0 mm.

The methods for producing the inner core layer and the outer core layer are not particularly limited. The inner core layer may be molded by a method in accordance with customary practice, such as that of forming the inner core layer material into a spherical shape under heating and compression at a temperature of between 140° C. and 180° C. for a period of from 10 to 60 minutes. The method used to form the outer core layer on the surface of the inner core layer may involve forming a pair of half-cups from unvulcanized rubber in sheet form, placing the inner core layer within these cups so as to encapsulate it, and then molding under applied heat and pressure. For example, suitable use can be made of a process wherein, following initial vulcanization (semi-vulcanization) to produce a pair of hemispherical cups, the prefabricated inner core layer is placed in one of the hemispherical cups and then covered with the other hemispherical cup, in which state secondary vulcanization (complete vulcanization) is carried out. Alternatively, suitable use can be made of a process which divides vulcanization into two stages by rendering an unvulcanized rubber composition into sheet form so as to produce a pair of outer core layer-forming sheets, stamping the sheets using a die provided with a hemispherical protrusion to produce unvulcanized hemispherical cups, and subsequently covering a prefabricated inner core layer with a pair of these hemispherical cups and forming the whole into a spherical shape by heating and compression at between 140° C. and 180° C. for a period of from 10 to 60 minutes.

Next, the hardness profile of the core is described. The core hardnesses mentioned below are Shore D hardness values.

The hardness at the center of the core (Cc) is preferably at least 25, more preferably at least 26, and even more preferably at least 28. The upper limit is preferably not more than 44, more preferably not more than 41, and even more preferably not more than 37. When this value is too large, the feel of the ball at impact may be hard or the spin rate on full shots may rise, as a result of which the desired distance may not be obtained. On the other hand, when this value is too small, the rebound may be low and the ball may not fly far, or the durability to cracking on repeated impact may worsen.

The hardness at a position 14 mm from the center of the core ($C_{14}$) is preferably at least 30, more preferably at least 33, and even more preferably at least 35. The upper limit is preferably not more than 53, more preferably not more than 50, and even more preferably not more than 47. Outside of these hardnesses, disadvantageous effects similar to those mentioned above with regard to the center hardness of the core (Cc) may arise.

The hardness at the core surface (Cs) is preferably at least 54, more preferably at least 56, and even more preferably at least 58. The upper limit is preferably not more than 68, more preferably not more than 67, and even more preferably not more than 65. Outside of these hardnesses, disadvantageous effects similar to those mentioned above with regard to the center hardness of the core (Cc) may arise.

The difference between the surface hardness of the core (Cs) and the center hardness of the core (Cc) is at least 17, preferably at least 20, and more preferably at least 23. The upper limit is not more than 40, preferably not more than 37, and more preferably not more than 35. When this value is too small, the spin rate-lowering effect of the ball on shots with a driver is inadequate and a good distance may not be obtained. When this value is too large, the initial velocity of the ball on shots is low and a good distance may not be obtained, or the durability to cracking on repeated impact may worsen.

The core hardness profile in this invention is a hardness profile in which the hardness gradient increases from the core center toward the surface side; that is, the value $(Cs-C_{14})/(Cs-Cc)$ is at least 0.60 and not more than 0.80. By having the value $(Cs-C_{14})/(Cs-Cc)$ be from 0.60 to 0.80, when a professional golfer or a skilled amateur hits the ball with a driver (W #1) at a high head speed, the ball has a high initial velocity and a spin rate-lowering effect can be fully achieved. The value $(Cs-C_{14})/(Cs-Cc)$ has a lower limit of preferably at least 0.61, and more preferably at least 0.62, and an upper value that is preferably not more than 0.77, and more preferably not more than 0.75. When this value is too large, the initial velocity of the ball on shots may become low or the spin rate-lowering effect may be inadequate, as a result of which a good distance may not be achieved, or the durability to cracking on repeated impact may worsen.

The value $Cs-C_{14}$ has a lower limit of preferably at least 14, more preferably at least 16, and even more preferably at least 17. The upper limit is preferably not more than 30, more preferably not more than 27, and even more preferably not more than 25. When this value is too large, the initial velocity on shots may become low or the spin rate-lowering effect may be inadequate, as a result of which a good distance may not be achieved, or the durability to cracking on repeated impact may worsen.

Next, the envelope layer is described.

The envelope layer has a material hardness on the Shore D scale which, although not particularly limited, is preferably front 50 to 75, and more preferably from 55 to 70. The surface hardness of the sphere obtained by encasing the core with the envelope layer (envelope layer-encased sphere), expressed in terms of Shore D hardness, is preferably from 53 to 77, and more preferably from 58 to 73. These material and surface hardnesses of the envelope layer are optimized in order to achieve a good ball spin rate on full shots, a good feel at impact and a good durability to cracking on repeated impact.

Letting He be the surface hardness of the envelope layer on the Shore D scale, the difference He–Cs between the surface hardness of the envelope layer (He) and the surface hardness of the core (Cs) has a lower limit of preferably at least 0, more preferably at least 1, and even more preferably at least 3. The upper limit is preferably not more than 17, more preferably not more than 12, and even more preferably not more than 7. When this value is too large, the durability to cracking may worsen. When it is too small, the spin rate of the ball on full shots may rise, as a result of which a good distance may not be obtained.

The envelope layer has a thickness (TO which is preferably at least 0.3 mm, more preferably at least 0.4 mm, and even more preferably at least 0.5 mm. The upper limit in the thickness of the envelope layer is preferably not more than 1.2 mm, more preferably not more than 1.1 mm, and even more preferably not more than 1.0 mm. When the envelope layer is too thin, the durability to cracking on repeated impact may worsen. When the envelope layer is too thick, the feel of the ball at impact may worsen.

The envelope layer material is not particularly limited, although various thermoplastic resin materials may be suitably employed for this purpose. For example, use can be made of ionomeric resins, urethane, amide, ester, olefin or styrene-type thermoplastic elastomers, and mixtures thereof. From the standpoint of obtaining a good rebound in the desired hardness range, the use of an ionomeric resin is preferred.

Commercial products may be used as such ionomeric resins and other resin materials. Illustrative examples include sodium-neutralized ionomeric resins such as Himilan® 1605, Himilan® 1601 and AM 7318 (all products of DuPont-Mitsui Polychemicals Co., Ltd.) and Surlyn® 8120 (E.I. DuPont de Nemours & Co.); zinc-neutralized ionomeric resins such as Himilan® 1557, Himilan® 1706 and AM 7317 (all products of DuPont-Mitsui Polychemicals Co., Ltd.); and the products available from E.I. DuPont de Nemours and Company under the trade names HPF 1000, HPF 2000 and HPF AD1027. These may be used singly or two or more may be used in combination. Preferred use can also be made of a resin material obtained by blending, of commercially available ionomeric resins, a high-acid ionomeric resin having an acid content of at least 18 wt % into a conventional ionomeric resin. The amount of such a high-acid ionomeric resin included per 100 wt % of the resin material is preferably at least 10 wt %, more preferably at least 30 wt %, and even more preferably at least 60 wt %. The upper limit is generally up to 100 wt %, preferably up to 90 wt %, and more preferably up to 80 wt %.

Next, the intermediate layer is described.

The intermediate layer has a material hardness which; although not particularly limited, is preferably slightly higher than that of the envelope layer. On the Shore D scale, the material hardness of the intermediate layer is preferably from 61 to 73, and more preferably from 64 to 70. The sphere obtained by encasing the core with the envelope layer and the intermediate layer (intermediate layer-encased sphere) has a surface hardness which, on the Shore D scale, is preferably from 65 to 79, and more preferably from 68 to 76. These material and surface hardnesses of the intermediate layer are optimized in order to achieve a good ball spin rate on full shots, a good feel at impact and a good durability to cracking on repeated impact.

Letting Hm be the surface hardness of the intermediate layer on the Shore D scale, the difference $Hm-C_{14}$ between the surface hardness of the intermediate layer (Hm) and the hardness of the core at a position 14 mm from the core center $(C_{14})$ has a lower limit of preferably at least 23, more preferably at least 25, and even more preferably at least 27. The upper limit is preferably not more than 40, more preferably not more than 37, and even more preferably not more than 35. When this value is too large, the durability to cracking may worsen. When it is too small, the spin rate of the ball on full shots may rise, as a result of which a good distance may not be obtained.

The difference Hm–Cc between the surface hardness of the intermediate layer (Hm) and the hardness at the center of the core (Cc) has a lower limit of preferably at least 27, more preferably at least 32, and even more preferably at least 37. The upper limit is to preferably not more than 55, more preferably not more than 50, and even more preferably not more than 45. When this value is too large, the durability to cracking may worsen. When it is too small, the spin rate of the ball on full shots may rise, as a result of which a good distance may not be obtained.

The difference Hm–He between the surface hardness of the intermediate layer (Hm) and the surface hardness of the envelope layer-encased sphere (He) has a lower limit of preferably at least 1, more preferably at least 2, and even more preferably at least 3. The upper limit is preferably not more than 17, more preferably not more than 12, and even more preferably not more than 7. When this value is too large, the durability to cracking may worsen. When it is too small, the spin rate of the ball on full shots may rise, as a result of which a good distance may not be obtained.

The difference Hm−Hc between the surface hardness of the intermediate layer (Hm) and the surface hardness of the subsequently described cover (Hc) has a lower limit of preferably at least 1, more preferably at least 5, and even more preferably at least 9. The upper limit is preferably not more than 28, more preferably not more than 23, and even more preferably not more than 18. When this value is too large, the durability to cracking may worsen. When it is too small, the spin rate of the ball on full shots may rise, as a result of which a good distance may not be obtained.

The intermediate layer has a thickness (Tm) which is preferably at least 0.3 mm, more preferably at least 0.4 mm, and even more preferably at least 0.5 mm. The upper limit in the thickness of the intermediate layer is preferably not more than 1.2 mm, more preferably not more than 1.1 mm, and even more preferably not more than 1.0 mm. When the intermediate layer is too thin, the durability to cracking on repeated impact may worsen. When the intermediate layer is too thick, the spin rate of the ball on full shots may rise, as a result of which a good distance may not be obtained.

It is critical in this invention for the sum Te+Tm of the thickness of the envelope layer (Tm) and the thickness of the intermediate layer (Te) to be from 0.8 to 1.7 mm. The preferred range in this combined thickness has a lower limit of preferably at least 1.0 mm, and more preferably at least 1.2 mm, and an upper limit of preferably not more than 1.6 mm, and more preferably not more than 1.5 mm. Outside of this range, a feel at impact that is soft and yet suitably solid cannot be achieved or the durability to cracking worsens.

The intermediate layer material is not particularly limited, although a resin material that is of the same type as or of a different type from the above-described envelope layer material may be used. In particular, in order to form the intermediate layer so as to be harder than the envelope layer, the use of an ionomeric resin is preferred. More preferred use can be made of a resin material obtained by blending, of commercially available ionomeric resins, a high-acid ionomeric resin having an acid content of at least 18 wt % into a conventional ionomeric resin. The amount of such a high-acid ionomeric resin included per 100 wt % of the resin material is preferably at least 10 wt %, more preferably at least 30 wt %, and even more preferably at least 60 wt %. The upper limit is generally up to 100 wt %, preferably up to 90 wt %, and more preferably up to 80 wt %.

Next, the cover is described.

As used herein, "cover" refers to the outermost layer of the golf ball, exclusive of a paint film, and typically is a layer in which, during injection molding, dimples are formed at the same time on the outer surface thereof. The cover has a material hardness on the Shore D scale which, although not particularly limited, is preferably from 35 to 55, and more preferably from 40 to 50. The surface hardness of the cover (also referred to as the ball surface hardness), expressed on the Shore D hardness scale, is preferably from 50 to 70, and more preferably from 54 to 65, When the material hardness of the cover and the surface hardness of the ball are lower than the above ranges, the spin rate of the ball on shots with a driver (W #1) may rise, along with which the initial velocity of the ball may decrease, which may result in a poor distance. On the other hand, when the material hardness of the cover and the surface hardness of the ball are too high, the durability of the ball to cracking on repeated impact may worsen.

The cover has a thickness (Tc) which is preferably at least 01 mm, more preferably at least 0.2 mm, and even more preferably at least 0.3 mm. The upper limit in the cover thickness is preferably not more than 1.5 mm, more preferably not more than 1.2 mm, and even more preferably not more than 1.0 mm. When the cover is too thin, the durability to cracking on repeated impact may worsen. When the cover is too thick, the spin rate of the ball on shots with a driver (W #1) may become too high, as a result of which a good distance may not be obtained.

In terms of the ability to achieve both a feel at impact that is soft and yet suitably solid and also a good durability to cracking, the relationship among the cover thickness (Tc), the envelope layer thickness (Te) and the intermediate layer thickness (Tm) preferably satisfies condition (4) below:

$$0.55 \leq (Te+Tm)/(Te+Tm+Tc) \leq 0.70. \tag{4}$$

The preferred range for this value has a lower limit of preferably at least 0.59, and more preferably at least 0.63, and an upper limit of preferably not more than 0.69, and more preferably not more than 0.68.

The cover material is not particularly limited; various types of thermoplastic resin materials and thermoset materials may be suitably used for this purpose. From the standpoint of achieving the desired effects of the present invention, it is preferable to use a urethane resin, especially a thermoplastic polyurethane, as the cover material in this invention. The thermoplastic polyurethane material may be a commercial product, examples of which include those available under the trade name Pandex from DIC Covestro Polymer, Ltd., and those available under the trade name Resamine from Dainichiseika Color Chemicals Mfg. Co., Ltd.

The manufacture of multi-piece solid golf balls in which the above-described core, envelope layer, intermediate layer and cover (outermost layer) are formed as successive layers may be carried out by a customary method such as a known injection molding process. For example, a multi-piece golf ball can be produced by successively injection-molding the envelope layer material and the intermediate layer material over the core so as to obtain an intermediate layer-encased sphere, and then injection-molding the cover material over the intermediate layer-encased sphere. Alternatively, the encasing layers may each be formed by enclosing the sphere to be encased within two half-cups that have been pre-molded into hemispherical shapes and then molding under applied heat and pressure.

Numerous dimples may be formed on the outside surface of the cover serving as the outermost layer. The number of dimples arranged on the cover surface, although not particularly limited, is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower, as a result of which the distance traveled by the ball may decrease. On the other hand, when the number of dimples is lower that this range, the ball trajectory may become higher, as a result of which a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to at least 70% and not more than 90%. Also, to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of a dimple, with respect to the volume of the ball sphere were the ball surface to have no dimples thereon, to be set to at least 0.6% and not more than 1.0%. Outside of the above ranges in these respective values, the resulting trajectory may not enable a good distance to be obtained and so the ball may fail to travel a fully satisfactory distance.

The multi-piece solid golf ball of the invention can be made to conform to the Rules of Golf for play. The inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Working Examples and Comparative Examples are provided to illustrate the invention, and are not intended to limit the scope thereof.

Working Examples 1 to 7, Comparative Examples 1 to 10

Formation of Two-Layer Core

In each Example, an inner core layer was produced by preparing the rubber composition for a spherical inner core layer shown in Table 1, and then vulcanizing/molding the composition at 155° C. for 13 minutes. Next, one-half of the outer core layer-forming rubber material was placed in an outer core layer mold, sandwiched between the mold and a die having a protrusion of the same radius as the inner core layer and heated at 155° C. for 1 minute, following which it was removed from the mold, thereby producing a half cup-shaped outer core layer. Another half-cup was similarly produced using the remaining half of the outer core layer-forming material. The two half-cups were then placed over the already vulcanized inner core layer and vulcanized/molded at 155° C. for 13 minutes, thereby producing an entire core (inner core layer+outer core layer) for each Example. In Working Example 7, the core was a single-layer core without an outer core layer, which single-layer core was produced by vulcanizing/molding the core material at 155° C. for 15 minutes.

TABLE 1

| Formulation (pbw) | | No. 1 | No. 2 | No. 3 | No. 4 | No. 5 | No. 6 | No. 7 | No. 8 | No. 9 | No. 10 | No. 11 |
|---|---|---|---|---|---|---|---|---|---|---|---|---|
| Inner core layer | Polybutadiene rubber A | 20 | 20 | 20 | 80 | 20 | 20 | 20 | 20 | 20 | 20 | 20 |
| | Polybutadiene rubber B | 80 | 80 | 80 | 20 | 80 | 80 | 80 | 80 | 80 | 80 | 80 |
| | Organic peroxide (1) | 0.3 | 0.3 | | 1.0 | 0.3 | 0.3 | 0.3 | 0.3 | 0.3 | 0.3 | |
| | Organic peroxide (2) | 0.3 | 0.3 | 0.9 | | 0.3 | 0.3 | 0.3 | 0.3 | 0.3 | 0.3 | 1.3 |
| | Barium sulfate | 21.1 | 21.1 | 21.1 | | 17.6 | 24.5 | 17.5 | 22.8 | 24.5 | 19.2 | 20.0 |
| | Zinc oxide | 4.0 | 4.0 | 4.0 | 12.0 | 4.0 | 4.0 | 4.0 | 4.0 | 4.0 | 4.0 | 4.0 |
| | Antioxidant (1) | | | | 0.1 | | | | | | | |
| | Antioxidant (2) | 0.1 | 0.3 | 0.1 | | 0.1 | 0.1 | 0.3 | 0.3 | 0.1 | 0.1 | 0.1 |
| | Zinc acrylate | 19.1 | 19.1 | 19.1 | 43.7 | 19.1 | 19.1 | 27.1 | 15.3 | 11.1 | 23.1 | 20.5 |
| | Zinc methacrylate | | | | 1.0 | | | | | | | |
| | Zinc salt of pentachlorothiophenol | | | | 0.5 | | | | | | | 0.1 |
| | Water | | | | 1.2 | | | | | | | |
| Outer core layer | Polybutadiene rubber A | 20 | 20 | 20 | | 20 | 20 | 20 | 20 | 20 | 20 | 20 |
| | Polybutadiene rubber B | 80 | 80 | 80 | | 80 | 80 | 80 | 80 | 80 | 80 | 80 |
| | Organic peroxide (1) | | | | | | | 0.3 | | | | |
| | Organic peroxide (2) | 1.2 | 1.2 | 1.2 | | 1.2 | 1.2 | 0.3 | 1.2 | 1.2 | 1.2 | 1.3 |
| | Barium sulfate | 11.8 | 11.8 | 11.8 | | 7.8 | 15.4 | 13.4 | 10.0 | 15.2 | 9.8 | 13.2 |
| | Zinc oxide | 4.0 | 4.0 | 4.0 | | 4.0 | 4.0 | 4.0 | 4.0 | 4.0 | 4.0 | 4.0 |
| | Antioxidant (2) | 0.1 | 0.1 | 0.1 | | 0.1 | 0.1 | 0.1 | 0.1 | 0.1 | 0.1 | 0.1 |
| | Zinc acrylate | 39.2 | 39.2 | 39.2 | | 39.2 | 39.2 | 36.2 | 43.5 | 31.2 | 43.2 | 35.5 |
| | Zinc salt of pentachlorothiophenol | 0.1 | 0.1 | 0.1 | | 0.1 | 0.1 | 0.1 | 0.1 | 0.1 | 0.1 | 0.1 |

Details on the ingredients mentioned in Table 1 are given below.

Polybutadiene A: Available under the trade name "BR 01" from JSR Corporation
Polybutadiene B: Available under the trade name "BR 51" from JSR Corporation
Organic Peroxide (1): Available under the trade name "Percumyl D" from NOF Corporation
Organic Peroxide (2): Available under the trade name "Perhexa. C-40" from NOF Corporation
Barium sulfate: Available as "Precipitated Barium Sulfate #100" from Sakai Chemical Co., Ltd.
Zinc oxide: Available as "Zinc Oxide Grade 3" from Sakai Chemical Co., Ltd.
Antioxidant (1): Available under the trade name "Nocrac NS-6" from Ouchi Shinko Chemical Industry Co., Ltd.
Antioxidant (2): Available under the trade name "Nocrac SP-N" from Ouchi Shinko Chemical Industry Co., Ltd.
Zinc acrylate: Available as "ZN-DA85S" from Nippon Shokubai Co., Ltd.
Zinc methacrylate: Available from Wako Pure Chemical Industries, Ltd.
Zinc salt of pentachlorothiophenol:
Available from Wako Pure Chemical Industries, Ltd.
Water: Pure waster (from Wako Pure Chemical Industries, Ltd.)

Formation of Envelope Layer and Intermediate Layer

Next, in each Working Example and Comparative Example, an envelope layer was formed by injection molding the envelope layer material formulated as shown in Table 2 over the core, following which the intermediate layer was formed by injection molding the intermediate layer material formulated as shown in the same table, thereby giving a sphere encased by an envelope layer and intermediate layer-encased sphere.

In Comparative Example 1, there was no envelope layer, Hence, the intermediate layer was formed by injection molding the intermediate layer material formulated as shown in Table 2 over the core, thereby giving an intermediate layer-encased sphere.

Formation of Cover (Outermost Layer)

Next, in each of the Working Examples and Comparative Examples, a cover (outermost layer) was formed by injection molding the cover material formulated as shown in Table 2 over the intermediate layer-encased sphere obtained as described above. A plurality of given dimples common to all the Working Examples and Comparative Examples were formed at this time on the surface of the cover.

TABLE 2

| Resin material (pbw) | Amount (wt %) | A | B | C | D |
|---|---|---|---|---|---|
| AM7318 | 18 | | 70 | | 75 |
| AM7329 | 15 | | 15 | | |
| Himilan 1706 | 15 | | 15 | | |
| Surlyn 9150 | 19 | | | 50 | |
| Surlyn 8150 | 19 | | | 50 | |
| AM7327 | 10 | | | | 25 |
| T-8290 | | 38 | | | |
| T-8283 | | 63 | | | |
| Hytrel 4001 | | 11 | | | |
| Silicone wax | | 0.6 | | | |
| Polyethylene wax | | 1.2 | | | |
| Isocyanate compound | | 7.5 | | | |
| Titanium oxide | | 3.9 | | | |
| Trimethylolpropane (TMP) | | | 1.1 | 1.1 | 1.1 |

Trade names of the chief materials mentioned in the table are given below.

Himilan 1706, AM7318, AM7329, AM7327:
Ionomers available from DuPont-Mitsui Polychemicals Co., Ltd.
Surlyn 9150, Surlyn 8150: Ionomers available from E.I. DuPont de Nemours and Company
T-8290, T-8283: Thermoplastic polyurethanes available under the trade name Pandex from DIC Covestro Polymer, Ltd.
Hytrel 4001: A thermoplastic polyester elastomer available from DuPont-Toray Co., Ltd.
Polyethylene wax: Available under the trade name "Sanwax 161P" from Sanyo Chemical Industries, Ltd.
Isocyanate compound: 4,4'-Diphenylmethane diisocyanate Various properties of the resulting golf balls, including the internal hardnesses of the core, the diameters of the core and the respective layer-encased spheres, the material hardnesses of each layer, and the surface hardness of the respective layer-encased spheres were evaluated by the following methods. The results are presented in Table 3.

Core Hardness Profile

To determine the cross-sectional hardnesses at the center and other specific positions in each core, the core or the inner core layer-containing outer core layer was hemispherically cut so as to form a flat cross-sectional plane, and measurement was carried out by pressing the durometer indenter perpendicularly against the place to be measured. The hardness at the spherical surface of the core was measured by setting the durometer indenter substantially perpendicular to this spherical surface. These hardness measurements were carried out with a type D durometer (Shore D) in general accordance with ASTM D2240-95, it should be noted, however, that the thickness and shape of the samples differ from those mentioned in this standard, with measurement at the interior of the core being carried out, as mentioned above, by cutting the core into hemispheres.

Material Hardnesses (Shore D Hardnesses) of Envelope Layer, Intermediate Layer and Cover The resin materials for each of the layers were molded into sheets having a thickness of 2 mm and left to stand for at least two weeks, following which the Shore D hardnesses were measured in accordance with ASTM D2240-95.

Surface Hardnesses (Shore D Hardnesses) of Envelope Layer-Encased Sphere, Intermediate Layer-Encased Sphere and Ball Measurements were taken by pressing the durometer indenter perpendicularly against the surface of each sphere. The surface hardness of the ball (cover) is the measured value obtained at dimple-free places (lands) on the ball surface. The Shore D hardnesses were measured with a type D durometer in accordance with ASTM D2240-95.

The distance on shots with a driver, feel at impact and durability of each golf ball were evaluated as described below. The results are shown in Table 4.

Distance

Using the TourB XD-5 Driver (loft angle, 9.5°) manufactured by Bridgestone Sports Co., Ltd. as the striking club, the distance traveled by the ball when struck at a head speed of 45 m/s with the club mounted on a golf swing robot was measured and then rated according to the following criteria.

Rating Criteria

Good: Total distance was 233 m or more
NG: Total distance was less than 233 m

Feel

Sensory evaluations were carried out when the balls were hit with a driver (W #1) by golfers having head speeds of 43 to 50 m/s. The feel of the ball was rated according to the following criteria.

Rating Criteria:
Good: Six or more of ten golfers rated the feel as good
NG: Five or fewer of ten golfers rated the feel as good.
Here, a "good feel" means that the ball has a feel at impact that is suitably soft yet solid.

Durability

A driver (W #1) was mounted on a golf swing robot and the balls in the respective Examples were repeatedly struck at a head speed of 40 m/s. The durability index in each Example was calculated relative to an arbitrary index of 100 for the number of shots at which the ball in Working Example 1 began to crack, and the durability was rated according to the following criteria.

Rating Criteria:
Good: Durability index was 95 or more
NG: Durability index was less than 95

TABLE 3

|  |  | Working Example | | | | | | |
|---|---|---|---|---|---|---|---|---|
|  |  | 1 | 2 | 3 | 4 | 5 | 6 | 7 |
| Core | Formulation | No. 1 | No. 2 | No. 3 | No. 1 | No. 1 | No. 1 | No. 4 |
|  | Structure | 2-layer | 2-layer | 2-layer | 2-layer | 2-layer | 2-layer | single layer |
|  | Diameter of inner core layer (mm) | 29.0 | 29.0 | 29.0 | 29.0 | 29.0 | 29.0 | none |
|  | Diameter of overall core (mm) | 38.5 | 38.5 | 38.5 | 38.3 | 38.3 | 39.1 | 38.5 |
| Core hardness profile (Shore D) | Core surface hardness: Cs | 63 | 63 | 63 | 63 | 63 | 64 | 62 |
|  | Hardness 14 mm from center: C14 | 40 | 40 | 43 | 40 | 40 | 40 | 45 |
|  | Core center hardness: Cc | 31 | 33 | 30 | 31 | 31 | 31 | 38 |
|  | Cs − C14 | 23 | 23 | 20 | 23 | 23 | 24 | 17 |
|  | Cs − Cc | 32 | 30 | 33 | 32 | 32 | 33 | 24 |
|  | C14 − Cc | 9 | 7 | 13 | 9 | 9 | 9 | 7 |
|  | (Cs − C14)/(Cs − Cc) | 0.72 | 0.77 | 0.61 | 0.72 | 0.72 | 0.73 | 0.71 |
| Envelope layer | Material | D | D | D | D | D | D | D |
|  | Thickness: Te (mm) | 0.6 | 0.6 | 0.6 | 0.5 | 1.0 | 0.4 | 0.6 |
|  | Material hardness (Shore D) | 62 | 62 | 62 | 62 | 62 | 62 | 62 |
| Envelope layer-encased sphere | Diameter (mm) | 39.7 | 39.7 | 39.7 | 39.3 | 40.3 | 39.9 | 39.7 |
|  | Surface hardness: He (Shore D) | 67 | 67 | 67 | 67 | 67 | 67 | 67 |
| Intermediate layer | Material | B | B | B | B | B | C | B |
|  | Thickness: Tm (mm) | 0.8 | 0.8 | 0.8 | 1.0 | 0.5 | 0.7 | 0.8 |
|  | Material hardness (Shore D) | 66 | 66 | 66 | 66 | 66 | 68 | 66 |
| Intermediate layer-encased sphere | Diameter (mm) | 41.3 | 41.3 | 41.3 | 41.3 | 41.3 | 41.3 | 41.3 |
|  | Surface hardness: Hm (Shore D) | 70 | 70 | 70 | 70 | 70 | 73 | 70 |
| Cover | Material | A | A | A | A | A | A | A |
|  | Thickness: Tc (mm) | 0.7 | 0.7 | 0.7 | 0.7 | 0.7 | 0.7 | 0.7 |
|  | Material hardness (Shore D) | 44 | 44 | 44 | 44 | 44 | 44 | 44 |
| Ball | Diameter (mm) | 42.7 | 42.7 | 42.7 | 42.7 | 42.7 | 42.7 | 42.7 |
|  | Surface hardness: Hc (Shore D) | 59 | 59 | 59 | 59 | 59 | 59 | 59 |
| Thickness relationship | Te + Tm (mm) | 1.4 | 1.4 | 1.4 | 1.5 | 1.5 | 1.1 | 1.4 |
| Thickness relationship | (Te + Tm)/(Te + Tm + Tc) | 0.67 | 0.67 | 0.67 | 0.68 | 0.68 | 061 | 0.67 |
| Hardness relationship | Hm − C14 | 30 | 30 | 27 | 30 | 30 | 33 | 25 |
| Ball evaluations | Distance (m) | 235 | 237 | 235 | 237 | 233 | 237 | 233 |
|  | Feel | good | good | good | good | good | good | good |
|  | Durability | good | good | good | good | good | good | good |

TABLE 4

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Core | Formulation | No. 5 | No. 6 | No. 6 | No. 6 | No. 5 | No. 7 | No. 8 | No. 9 | No. 10 | No. 11 |
|  | Structure | 2-layer | 2-layer | 2-layer | 2-layer | 2-layer | 2-layer | 2-layer | 2-layer | 2-layer | 2-layer |
|  | Diameter of inner core layer (mm) | 29.0 | 29.0 | 29.0 | 29.0 | 29.0 | 29.0 | 29.0 | 29.0 | 29.0 | 29.0 |
|  | Diameter of overall core (mm) | 39.7 | 37.3 | 37.5 | 37.5 | 39.9 | 38.5 | 38.5 | 38.5 | 38.5 | 38.5 |
| Core hardness profile (Shore D) | Core surface hardness: Cs | 63 | 62 | 62 | 62 | 64 | 60 | 65 | 53 | 69 | 61 |
|  | Hardness 14 mm from center: C14 | 40 | 40 | 40 | 40 | 40 | 50 | 34 | 31 | 45 | 48 |
|  | Core center hardness: Cc | 31 | 31 | 31 | 31 | 31 | 45 | 28 | 22 | 36 | 29 |
|  | Cs − C14 | 23 | 22 | 22 | 22 | 24 | 10 | 31 | 22 | 24 | 13 |
|  | Cs − Cc | 32 | 31 | 31 | 31 | 33 | 15 | 37 | 31 | 33 | 32 |
|  | C14 − Cc | 9 | 9 | 9 | 9 | 9 | 5 | 6 | 9 | 9 | 19 |
|  | (Cs − C14)/(Cs − Cc) | 0.72 | 0.71 | 0.71 | 0.71 | 0.73 | 0.67 | 0.84 | 0.71 | 0.73 | 0.41 |
| Envelope layer | Material | none | D | D | D | D | D | D | D | D | D |
|  | Thickness: Te (mm) |  | 1.0 | 0.6 | 1.3 | 0.3 | 0.6 | 0.6 | 0.6 | 0.6 | 0.6 |
|  | Material hardness (Shore D) |  | 62 | 62 | 62 | 62 | 62 | 62 | 62 | 62 | 62 |
| Envelope layer-encased sphere | Diameter (mm) | — | 39.3 | 38.7 | 40.1 | 40.5 | 39.7 | 39.7 | 39.7 | 39.7 | 39.7 |
|  | Surface hardness: He (Shore D) |  | 67 | 67 | 67 | 67 | 67 | 67 | 67 | 67 | 67 |

TABLE 4-continued

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Intermediate layer | Material | B | B | B | B | B | B | B | B | B | B |
|  | Thickness: Tm (mm) | 0.8 | 1.0 | 1.3 | 0.6 | 0.4 | 0.8 | 0.8 | 0.8 | 0.8 | 0.8 |
|  | Material hardness (Shore D) | 66 | 66 | 66 | 66 | 66 | 66 | 66 | 66 | 66 | 66 |
| Intermediate layer-encased sphere | Diameter (mm) | 41.3 | 41.3 | 41.3 | 41.3 | 41.3 | 41.3 | 41.3 | 41.3 | 41.3 | 41.3 |
|  | Surface hardness: Hm (Shore D) | 70 | 70 | 70 | 70 | 70 | 70 | 70 | 70 | 70 | 70 |
| Cover | Material | A | A | A | A | A | A | A | A | A | A |
|  | Thickness: Tc (mm) | 0.7 | 0.7 | 0.7 | 0.7 | 0.7 | 0.7 | 0.7 | 0.7 | 0.7 | 0.7 |
|  | Material hardness (Shore D) | 44 | 44 | 44 | 44 | 44 | 44 | 44 | 44 | 44 | 44 |
| Ball | Diameter (mm) | 42.7 | 42.7 | 42.7 | 42.7 | 42.7 | 42.7 | 42.7 | 42.7 | 42.7 | 42.7 |
|  | Surface hardness: Hc (Shore D) | 59 | 59 | 59 | 59 | 59 | 59 | 59 | 59 | 59 | 59 |
| Thickness relationship | Te + Tm (mm) | 0.8 | 2.0 | 1.9 | 1.9 | 0.7 | 1.4 | 1.4 | 1.4 | 1.4 | 1.4 |
| Thickness relationship | (Te + Tm)/(Te + Tm + Tc) | 0.53 | 0.74 | 0.73 | 0.73 | 0.5 | 0.67 | 0.67 | 0.67 | 0.67 | 0.67 |
| Hardness relationship | Hm − C14 | 30 | 30 | 30 | 30 | 30 | 20 | 36 | 39 | 25 | 22 |
| Ball evaluations | Distance (m) | 232 | 235 | 236 | 234 | 233 | 231 | 236 | 230 | 235 | 232 |
|  | Feel | good | NG | NG | NG | good | good | good | NG | good | good |
|  | Durability | NG | good | good | fair | NG | good | NG | NG | NG | good |

As is apparent from the results in Tables 3 and 4, the golf balls obtained in Comparative Examples 1 to 10 were inferior in the following respects to the golf balls according to the present invention that were obtained in the Working Examples.

The golf ball in Comparative Example 1 lacked an envelope layer, resulting in a shorter than desirable distance and a poor durability.

The golf ball in Comparative Example 2 had a relatively large combined thickness for the envelope layer and the intermediate layer, resulting in a poor feel at impact.

In Comparative Example 3, the thickness of the intermediate layer was relatively large and the golf ball had a large combined thickness for the envelope layer and the intermediate layer, resulting in a poor feel at impact.

In Comparative Example 4, the thickness of the envelope layer was large and the golf ball had a large combined thickness for the envelope layer and the intermediate layer, resulting in a poor feel at impact and a somewhat inferior durability.

The golf ball in Comparative Example 5 had a small combined thickness for the envelope layer and the intermediate layer, resulting in a poor feel at impact.

The golf ball in Comparative Example 6 had a small hardness difference between the surface and center of the core, resulting in an inferior distance.

In Comparative Example 7, the $(Cs-C_{14})/(Cs-Cc)$ value indicating the core hardness gradient of the golf ball was large, resulting in a poor durability.

The golf ball in Comparative Example 8 had a small core surface hardness, resulting in an inferior distance and a poor durability.

The golf ball in Comparative Example 9 had a large core surface hardness, resulting in a poor durability.

In Comparative Example 10, the $(Cs-C_{14})/(Cs-Cc)$ value indicating the core hardness gradient of the golf ball was small, resulting in an inferior distance.

Japanese Patent Application No. 2018-118746 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer, an intermediate layer and a cover, wherein the core has a hardness profile which, letting Cc be the Shore D hardness at a center of the core, Cs be the Shore D hardness at a surface of the core and $C_{14}$ be the Shore D hardness at a position 14 mm from the core center, satisfies conditions (1) to (3) below $$54 \leq Cs \leq 68, \quad (1)$$

$$17 \leq Cs - Cc \leq 40, \text{ and} \quad (2)$$

$$0.60 \leq (Cs - C_{14})/(Cs - Cc) \leq 0.80; \quad (3)$$

the envelope layer has a thickness Te which is from 0.3 to 1.2 mm; the intermediate layer has a thickness Tm which is from 0.3 to 1.2 mm; and the sum Te+Tm of the envelope thickness and the intermediate layer thickness is from 0.8 to 1.7 mm, wherein the sphere (I) comprising the core encased by the envelope layer and the sphere (II) comprising sphere I encased by the intermediate layer have a surface hardness relationship therebetween on the Shore D scale which satisfies the following condition:

surface hardness of core (Cs)<surface hardness of sphere I<surface hardness of sphere II, wherein sphere II has a higher surface hardness than the ball, and wherein the envelope layer is made of a thermoplastic resin material selected from the group consisting of ionomeric resins, urethane, amide, ester, olefin or styrene-type thermoplastic elastomers, and mixtures thereof.

2. The golf ball of claim 1, wherein the core comprises a spherical inner core layer and an outer layer encasing the inner core layer.

3. The golf ball of claim 2, wherein the inner core layer has a diameter of at least 28 mm.

4. The golf ball of claim 1, wherein the Shore D hardness at the center of the core (Cc) is from 25 to 44.

5. The golf ball of claim 1, wherein the difference between the surface hardness of the core (Cs) and the hardness at a position 14 mm from the core center ($C_{14}$), expressed as Cs-$C_{14}$, is from 14 to 30.

6. The golf ball of claim 1 wherein, letting Hm be the Shore D hardness at a surface of the intermediate layer, the difference between the surface hardness of the intermediate layer and the hardness at a position 14 mm from the core center, expressed as Hm-$C_{14}$, is from 23 to 40.

7. The golf ball of claim 1 wherein, letting Tc be the thickness of the cover, the relationship among the envelope layer thickness Te, the intermediate layer thickness Tm and the cover thickness Tc satisfies condition (4) below:

$$0.55 \leq (Te+Tm)/(Te+Tm+Tc) \leq 0.70. \qquad (4)$$

8. The golf ball of claim 1, wherein letting Hm be the Shore D hardness at a surface of the intermediate layer and letting He be the surface hardness of the envelope layer on the Shore D scale, the difference between the surface hardness of the intermediate layer and the surface hardness of the envelope layer, expressed as Hm-He, is from 1 to 17.

9. The golf ball of claim 2, wherein the outer core layer has a thickness of from 2.0 to 7.0 mm.

10. The golf ball of claim 1, wherein the difference He-Cs is from 0 to 17.

11. The golf ball of claim 1, wherein the difference Hm-Cc is from 27 to 55.

12. The golf ball of claim 1, wherein letting Hc be the Shore D hardness at the surface hardness of the cover, the difference Hm-Hc is from 1 to 28.

\* \* \* \* \*